United States Patent
Ansari et al.

(10) Patent No.: US 7,970,393 B2
(45) Date of Patent: Jun. 28, 2011

(54) SYSTEMS AND METHODS FOR RAPIDLY ENABLING BREW-BASED WIRELESS HANDSETS FOR CONTENT DEVELOPMENT

(75) Inventors: Yasser Ansari, Mission Viejo, CA (US); Kotaro Matsuo, Poway, CA (US)

(73) Assignee: Kyocera Corporation, Kyoto (JP)

( * ) Notice: Subject to any disclaimer, the term of this patent is extended or adjusted under 35 U.S.C. 154(b) by 443 days.

(21) Appl. No.: 11/339,229

(22) Filed: Jan. 24, 2006

(65) Prior Publication Data
US 2007/0174380 A1   Jul. 26, 2007

(51) Int. Cl.
- *H04B 1/10* (2006.01)
- *H04B 1/16* (2006.01)
- *G05B 13/02* (2006.01)
- *H04W 4/00* (2009.01)
- *G06F 11/00* (2006.01)
- *G06F 9/445* (2006.01)

(52) U.S. Cl. ........ 455/423; 455/411; 455/418; 455/419; 700/26; 370/328; 714/36; 717/177; 717/118; 717/178

(58) Field of Classification Search .......... 455/423, 455/411, 418, 419; 700/200, 26; 370/328; 714/38, 36; 717/177, 118, 178
See application file for complete search history.

(56) References Cited

U.S. PATENT DOCUMENTS

| | | | |
|---|---|---|---|
| 6,412,055 B2 * | 6/2002 | Tallo et al. | 711/173 |
| 6,434,364 B1 * | 8/2002 | O'Riordain | 455/67.11 |
| 6,546,554 B1 * | 4/2003 | Schmidt et al. | 717/176 |
| 2001/0046862 A1 | 11/2001 | Coppinger et al. | |
| 2002/0070753 A1 * | 6/2002 | Vogel et al. | 326/37 |
| 2002/0073334 A1 * | 6/2002 | Sherman et al. | 713/201 |
| 2003/0060189 A1 * | 3/2003 | Minear et al. | 455/411 |
| 2004/0102187 A1 * | 5/2004 | Moller et al. | 455/418 |
| 2005/0083877 A1 * | 4/2005 | Zilliacus et al. | 370/328 |
| 2005/0113092 A1 | 5/2005 | Coppinger et al. | |
| 2007/0174818 A1 * | 7/2007 | Pasula | 717/136 |

* cited by examiner

*Primary Examiner* — Ariel Balaoing

(57) ABSTRACT

An application development system comprises a test-enable authority configured to store test-enable software for a plurality of mobile communication devices. In order to develop new applications, e.g. BREW applications, for a mobile communication device, the mobile communication device should be "test-enabled." Mobile communication devices can be test-enabled using test-enable software that can, for example, be downloaded from the test-enable authority by a software developer. In one aspect, the test-enable software can install on the developer's computer, run a predetermined number of times and then uninstall. This allows communication device manufacturers to control the number of test-enabled communication devices in the market. In addition, this can save time, money, and effort for communication device manufacturers as well as developers.

20 Claims, 2 Drawing Sheets

SYSTEMS AND METHODS FOR RAPIDLY ENABLING BREW-BASED WIRELESS HANDSETS FOR CONTENT DEVELOPMENT

FIELD OF THE INVENTION

The present invention relates generally to mobile communication devices and more particularly to application development for BREW enabled mobile communication devices.

BACKGROUND OF THE INVENTION

Mobile Communication device manufacturers often enlist the services of content developers to develop software applications and other content for Mobile Communication devices developed by the manufacturers. This allows the manufacturer to concentrate on its core strength, device manufacturing, and allows others, whose core strength is content and/or application development to concentrate on developing content for the devices. Often, before the content is approved the devices must first be put in a special test or development mode in order for development and testing of the content and/or application on the devices.

For example, in the BREW environment, application developers cannot load files onto handsets until they have been "Brew test-enabled" (test-enabled). BREW is a software development system developed by Qualcomm, Inc. that helps content developers develop applications for mobile communication devices such as instant messaging applications, email applications, smart navigation, office applications, photo sharing applications, video, games, etc. Generally, CDMA mobile communication device manufacturers ship the mobile communication devices to content developers and the content developers ship the communication devices to Qualcomm, Inc. so that the mobile communication devices can be test-enabled. This can be a time consuming process.

Thus, in a conventional process, as illustrated in FIG. 1, communication device manufacturers 102 ship a communication device to content developers 100. When the device does arrive at content developer 100 it is generally not test-enabled. Content developers 100 then ship the devices to a third party, such as Qualcomm, Inc. in order to have the device test enabled. Shipping the mobile communication device can take a few days. When the device arrives back at content developer 100 after shipping it to the third party it is then generally test-enabled. The term "mobile communication device" will refer to mobile telephone handsets, personal digital assistants that are wirelessly enabled, or any other portable wirelessly enabled communication device.

In most cases, a mobile telecommunication device manufacturer 102 sends devices that are ready to ship to customers, i.e. devices that have come directly off of the production line. Such devices are generally not test enabled. This simplifies the process for manufacturers 102, because content developers 100 may request many communication devices. Further, many different content developers may simultaneously be developing content for the communication devices. This can lead to requests for many hundreds of each type of communication device that manufacturer 102 makes. It can be inconvenient for a manufacturer to disrupt their normal manufacturing process to test-enable this many devices before sending them to content developer 100.

For this reason, many manufacturers 102 simply ship production communication devices that are not test-enabled. Content developers 100, however, require test-enabled communication devices that can be used to develop new software (content) for the communication device.

As a result, content developers 100 then ship the communication device to a third party 104 that manages content development, for example, BREW application development is managed by Qualcomm Corporation. Third party 104 can test-enable the devices, e.g., by enabling a test-bit or other similar method, and then ship the communication device back to content developer 100. This process can take as long as 8 days and perhaps longer. The time delay can make it difficult for content developer 100 to meet development deadlines for the software that they develop. These deadlines can be critical for manufacturers, application and/or content developers, as well as carriers, since it can be important to get the software to market quickly to maximize any marketing advantage related to the additional content.

Not only can the problems discussed lead to long lead times for test-enabled communication devices, communication devices can also get lost in transit, for example, by the shipping company. The long lead times, and lost devices, can impact when devices with new content are available to consumers.

SUMMARY OF THE INVENTION

An application development system comprises a test-enable authority configured to store test-enable software and/or a test enable command for a plurality of mobile communication devices. In order to develop new applications, e.g. BREW applications, for a mobile communication device, the mobile communication device should be "test-enabled." Mobile communication devices can be test-enabled using test-enable software and/or a test-enable command that can, for example, be downloaded from the test-enable authority by a software developer.

In one aspect, the test-enable software can be downloaded and installed on the developer's computer, run a predetermined number of times, and then uninstall. This allows communication device manufacturers to control the number of test-enabled communication devices.

Another aspect of the embodiments described herein can include a system for developing content on a communication device which can comprise: a server, test-enabling software uploaded to the server over a first communication link, wherein the test-enabling software is configured to test-enable a communication device, a computer capable of downloading the test-enabling software from the server over a second commutation link, and a communication device coupled to the computer and capable of being test-enabled when the test-enabling software is run on the computer. In some configurations the communication device and the computer can be one unified device.

The present invention further relates to machine readable media on which are stored embodiments of the present invention. It is contemplated that any media suitable for storing instructions is within the scope of the present invention. By way of example, such media may take the form of magnetic, optical, or semiconductor media. The invention also relates to data structures that contain embodiments of the present invention, and to the transmission of data structures containing embodiments of the present invention.

Other features and advantages of the present invention will become more readily apparent to those of ordinary skill in the art after reviewing the following detailed description and accompanying drawings.

DETAILED DESCRIPTION

Figure 2:
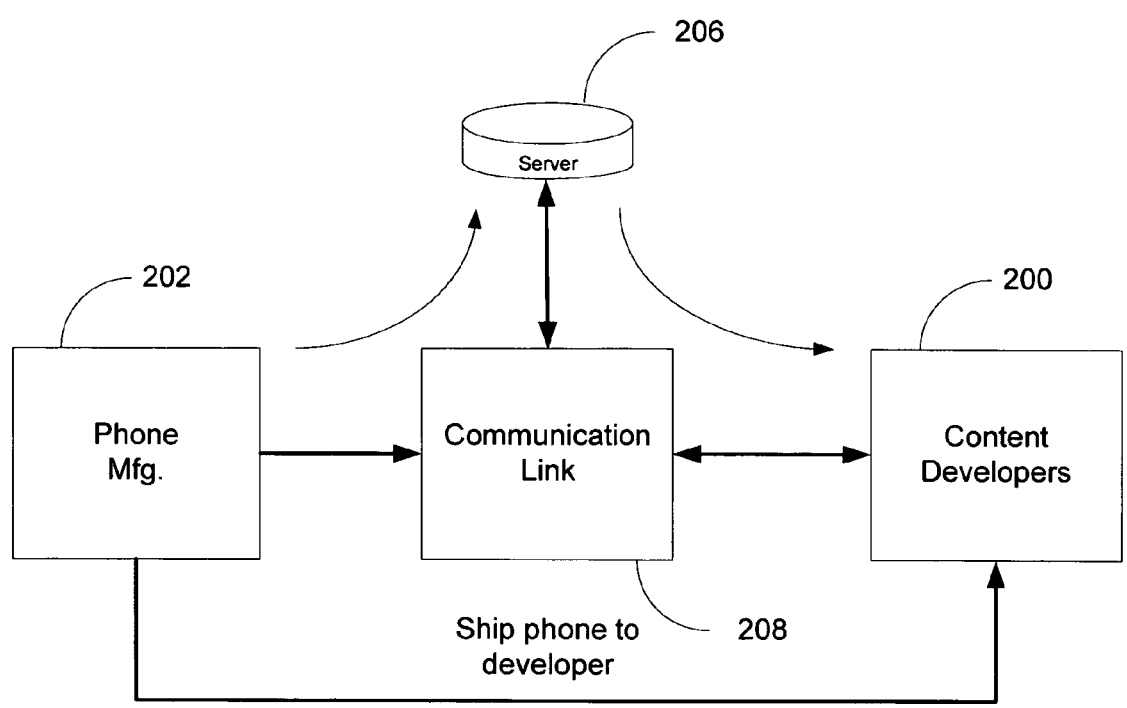
FIG. 2 is a diagram illustrating an application development system for developing software content for a mobile communication device in accordance with one embodiment.

FIG. 2 is a diagram illustrating an example application development system configured to enable software content development for a mobile communication device in accordance with one embodiment of the systems and methods described herein. In the example of FIG. 2, mobile communication device manufacturer 202 can provide content developer 200 with one or more mobile communication devices by shipping the mobile communication devices to content developer 200. The mobile communication devices can be shipped from manufacturer 202 without the need to "test-enable" the communication device at the factory. This means that mobile communication devices that are "off the shelf" can be shipped to content developer 200, e.g., any mobile communication device the content developer needs can be shipped without any additional programming, or changing of the mobile communication device.

As a result, the mobile communication device can, e.g., be shipped to content developer 200 without removing the mobile communication device from its packaging, making changes to the mobile communication device, repackaging the mobile communication device, etc. This can save time, money, and effort for mobile communication device manufacturer 202. Additionally, since off the shelf mobile communication devices are used, content developers can purchase mobile communication devices from local retailers if necessary, for example to avoid the time it would take to ship the mobile communication device from the manufacturer 202.

The examples discussed below refer to test-enable software, it will be apparent that the systems and methods described relate to a test-enable command, or commands, as well as test-enable software.

In order to enable testing of the off the shelf devices for software development, test-enable software, can be uploaded to a development authority 206 using a communications link, 208, e.g., the internet. The test-enable software can then be stored on development authority 206, e.g., in memory or some other form of storage such as a disk drive, tape, floppy disk, CD, DVD, or other portable storage medium. Development authority 206 can comprise any type of storage media or device that can be used to store the test-enable software. Collectively, any such media or device will be referred to as "storage media."

Depending on the embodiment, development authority 206 can be located locally within the systems of manufacturer 202 and connected through communication link 208 to content developers 200, using, for example, the internet. It will be understood that communication link 208 can comprise multiple communication links and multiple types of communication links. For example, communication link 208 can comprise one or more wired or wireless Personal Area Networks (PANs), one or more wired or wireless Local Area Networks (LANs), one ore more wired or wireless Wide Area Networks (WANs), one or more wired or wireless Metropolitan Area Networks (MANs), or some combination thereof.

The term "authority" as used in "development authority" 206 is intended to refer to all the systems, both hardware and software, comprising development authority 206. Thus, the term authority can encompass one or more servers, such as file servers, web servers, email servers, etc., one or more computers, one or more routers, one or more databases, one or more communication interfaces, one or more software algorithms, one or more communications programs or routines, one or more APIs, etc.

Similarly, content developer 200 comprises a computer or server system configured to interface with development authority 206 via communication link 208. The computer or server system can comprise one ore more computers, routers, servers, databases, etc., e.g., all the necessary hardware and software required to perform the functions described herein. Alternatively, content developer 200 can comprise a wireless, cell phone, LAN, WAN or similar signal request directly from the mobile communication device to the development authority 206 via the communication link 208.

The test-enable software can be downloaded from development authority 206 by content developer 200 over communication link 208. Prior to downloading, content developer 200 can be provided access information, such as a user ID and password. Additionally, the test enable software can be encrypted for transmission using one or more known encryption algorithms.

The test-enable software can be used to enable a mobile communication device for software development. As discussed above, the mobile communication device is not sold "test-enabled" since the vast majority of users will simply use the mobile communication device to, for example, make telephone calls and run other applications, rather than as a platform for developing software for the mobile communication device. In order to test-enable a device, the test-enable software is loaded on a computer by the content developer. An Input/Output (I/O) system is interfaced with the computer, or server that allows mobile communication devices to be interfaced with the computer, or server. The software can then access the mobile communication device configuration information and perform, or cause the device to perform, the necessary instructions to test-enable the device. By allowing devices to be test-enabled by content developer 200, the step of shipping to the third party corporation 104 for programming can be eliminated, as can the associated delay involved. Alternatively, the development authority 206 can send out a command to the phone via SMS, Over the Air (OTA) upgrade or other method to put the mobile communication device directly into test-enabled mode.

Figure 1:
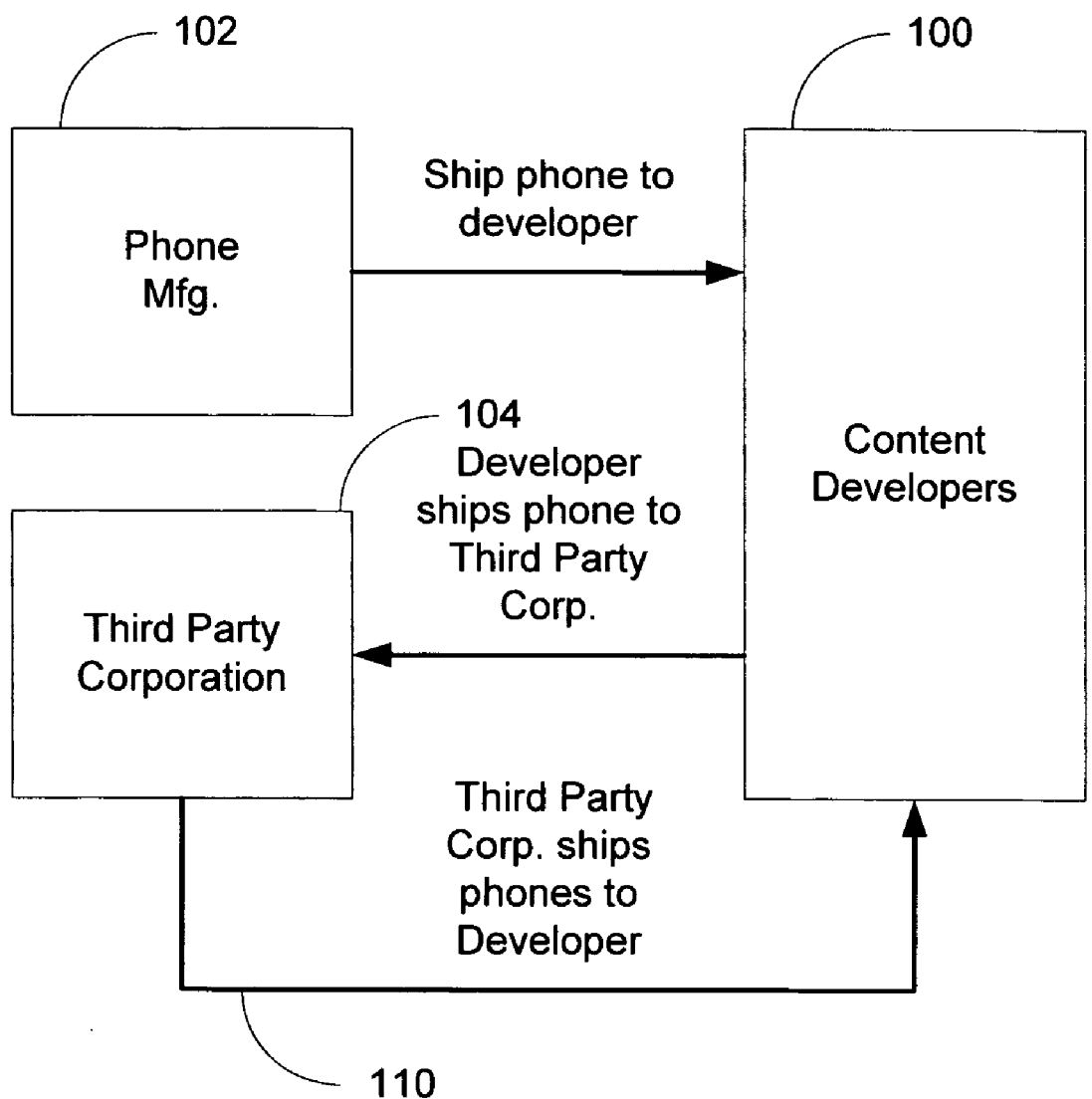
FIG. 1 is a diagram illustrating an exemplary method of developing software content for a mobile communication device.

It can be preferable for manufacturer 202 to maintain some control over test-enabled mobile communication devices. In the example of FIG. 1 this control was provided by using a single entity, third party corporation 104 to test enable all of the mobile communication devices.

In system 200, many different configurations are possible to allow manufacturers to maintain some control over test-enabled mobile communication devices. The software can, for example, self install after being downloaded off of development authority 206, run for a single use, or a limited number of uses and then be automatically deleted from the content developer's computer. This automatic delete process can be used to help mobile communication device manufacturers control who test-enables their mobile communication devices, when the mobile communication devices are test-enabled, and how many mobile communication devices are test-enabled. Alternatively, for, e.g., direct -to-mobile communication device implementation, the development authority 206 can keep a count of the number of times the service is utilized, which in turn can be used for billing purposes to for example, the content developer 200.

In certain embodiments, a single run of the test-enable software can enable multiple mobile communication devices serially. In other words, multiple mobile communication devices can be connected to the computer, or server running the test-enable software. When the test-enable software is run, each mobile communication device connected to the computer, can be test-enabled, one communication device at a time, until all the mobile communication devices are test-enabled.

The test-enable software can also be allowed to run, 2, 3, or more times, while still limiting the number of times the software can be run and, thereby limiting the number of test enabled mobile communication devices. In another embodiment, the test-enable software can track the number of mobile communication devices that have been test-enabled and only allow a preset number of mobile communication devices to be test-enabled, for example, a single mobile communication device, ten mobile communication devices, etc.

In one embodiment, a fee can be associated with the use or downloading of the test-enable software. For example, the manufacturer can charge a one-time fee to download the test-enable software. Alternatively, the fee can be varied depending on the number of devices that are test enabled.

It should be pointed out that it can be undesirable for a device manufacturer to charge a fee, since it can be important for the manufacturer to have a plurality of developers developing content for the manufacturer's devices. The added content can help drive sales and differentiate the manufacturer's devices from other devices in the market, however, the manufacturers can, in certain embodiments make the test-enable software available for free to encourage developers developing content for the manufacturer's devices, but charge developers to develop content for other manufacturer's devices. In other embodiments, a third party can actually make the test-enable software available, via a development authority 206, to manufacturers 202 and/or content developers 200. The third party can charge for some or all uses of the test-enable software depending on the scenario.

While certain embodiments of the inventions have been described above, it will be understood that the embodiments described are by way of example only. For example, while the systems and methods described above related generally to the development of BREW software applications for mobile communication devices, it will be apparent that the systems and methods described herein can apply to the development of any type of content and/or applications or any other process that requires testing of the devices. Accordingly, the inventions should not be limited based on the described embodiments. Rather, the scope of the inventions described herein should only be limited in light of the claims that follow when taken in conjunction with the above description and accompanying drawings.

What is claimed is:

1. A remote mobile communication device content development system, comprising:
   an internet communication link;
   a plurality of off the shelf portable communication devices that are not test enabled and not loaded with an application software being developed;
   a development authority, including:
      a storage media configured to store test-enable software that allows an off the shelf portable communications device to load an application from a developer, and that has been uploaded to the storage media, the test-enable software configured to automatically place the plurality of off the shelf portable communication device in a test-enable mode;
   a content developer including a computer and having an I/O system coupled to the plurality of off the shelf portable communication devices through the I/O system, and having the development authority provide the test-enable software to the content developer by the internet communications link so that the content developer can download in a single run the test enable software to the plurality of off the shelf portable communication devices serially so that the plurality of off the shelf portable communication devices are test enabled so that an application developer is then allowed to load an application onto the plurality of off the shelf portable communications devices; and
   loading the application onto the plurality of off the shelf portable communications devices after test-enabling then so that the application can be tested on the plurality of off the shelf portable communications devices.

2. The system of claim 1, wherein the software comprises a command.

3. The system of claim 1, wherein the copy of the test-enable software downloaded to the content developer is configured to run a preset number of times.

4. The system of claim 3, wherein the preset number of times is one.

5. The system of claim 4, wherein the test enable software is configured to uninstall after it is run the preset number of times.

6. The system of claim 1, wherein the test-enable software is configured to allow the content developer to test-enable a certain number of mobile communication devices.

7. The system of claim 6, wherein the test enable software is configured to uninstall after the certain number of mobile communication devices have been test-enabled.

8. A method of developing content for a communication device comprising:
   obtaining a plurality of off the shelf mobile communication devices;
   delivering test-enabling software for enabling a test bit over an internet communication link automatically from a server, the test-enabling software configured to automatically provide a test enable permission to place the plurality of communication devices in a test-enable mode for software development in a single run of the test enable software;
   running the test-enabling software; and
   downloading an application onto the test-enabled communication device that provides for software development.

9. The method of claim 8, wherein the test enabling software comprises a command.

10. The method of claim 8, wherein the communication link comprises the internet.

11. The method of claim 8, wherein the communication link comprises a landline communication link.

12. The method of claim 8, further comprising paying a fee to a communication device manufacturer.

13. The method of claim 8, wherein the content developed comprises a BREW application.

14. The method of claim 8, wherein the test-enable software test-enables a limited number of communication devices.

15. A system for developing content comprising:
   a server;
   test-enabling software automatically uploaded to the server over a first internet communication link;
   a computer capable of automatically downloading the test-enabling software from the server over a second internet commutation link;
   a plurality of communication devices coupled to the computer, wherein the test-enabling software is downloaded to automatically in a single run placing the plurality of communication devices in a test enable mode to allow later downloading of an application to be tested on the plurality of communications devices when each of the plurality of communications devices are coupled in serial order to the computer; and downloading the application to be tested on each of the plurality of communication devices.

16. The system of claim 15, wherein the test-enabling software comprises a command.

17. The system of claim 15, wherein the first and second communication link comprises the internet.

18. The system of claim 15, wherein at least one of the first communication link and the second communication comprises the internet.

19. The system of claim 15, wherein the first and second communication link comprises a landline communication link.

20. The system of claim 15, wherein the communication device anc the computer are one unified device.

* * * * *